United States Patent
Tashiro et al.

(10) Patent No.: US 10,280,967 B2
(45) Date of Patent: May 7, 2019

(54) FIXING STRUCTURE AND ELECTRICAL CONNECTION BOX

(71) Applicant: Yazaki Corporation, Minato-ku, Tokyo (JP)

(72) Inventors: Hiroki Tashiro, Shizuoka (JP); Nobutaka Kaneko, Shizuoka (JP); Fumiyoshi Ohashi, Shizuoka (JP); Kouji Yonezu, Okazaki (JP); Yuya Yoshikawa, Toyota (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/725,345

(22) Filed: Oct. 5, 2017

(65) Prior Publication Data
US 2018/0100535 A1    Apr. 12, 2018

(30) Foreign Application Priority Data

Oct. 12, 2016 (JP) ................................ 2016-200787

(51) Int. Cl.
*F16B 39/24* (2006.01)
*B60R 11/00* (2006.01)
(Continued)

(52) U.S. Cl.
CPC .............. *F16B 39/24* (2013.01); *B60R 11/00* (2013.01); *H02G 3/081* (2013.01); *B60R 16/03* (2013.01); *B60R 2011/0052* (2013.01)

(58) Field of Classification Search
CPC ........ F16B 39/24; F16B 43/00; F16B 5/0233; F16B 5/0216; B60R 11/00; B60R 16/03;
(Continued)

(56) References Cited

U.S. PATENT DOCUMENTS 5,221,192 A * 6/1993 Heflin ...................... F16F 1/373
                                                    248/638
5,306,121 A * 4/1994 Heflin .................. F04B 39/0044
                                                    248/638
(Continued)

FOREIGN PATENT DOCUMENTS

JP            7-36528 U      7/1995
JP        2011-236940 A     11/2011
(Continued)

OTHER PUBLICATIONS

Japanese Office Action issued Japanese Application No. 2016-200787, dated Sep. 18, 2018.

*Primary Examiner* — Christopher Garft
(74) *Attorney, Agent, or Firm* — Sughrue Mion, PLLC (57) ABSTRACT

The fixing structure includes an installation portion having an installation hole into which an installation bolt provided in a chassis is inserted, and a spacer supported movably in horizontal directions perpendicular to an axial direction of the installation bolt inside the installation portion in a non-fastened state between the installation bolt and the nut. The spacer has a collar portion that is placed between an inner circumferential surface of the installation hole and an outer circumferential surface of the installation bolt and makes contact with the chassis and the washer in the axial direction of the installation bolt in a fastened state between the installation bolt and the nut, and a flange portion formed to protrude outward from the outer circumference of the collar portion and supported movably in the horizontal directions in a non-fastened state. The flange portion is fixed inside the installation portion in the fastened state.

4 Claims, 8 Drawing Sheets

(51) Int. Cl.
*H02G 3/08* (2006.01)
*B60R 16/03* (2006.01)

(58) Field of Classification Search
CPC ............ B60R 2011/0052; H02G 3/081; Y10T 403/75
USPC ..... 248/231.9, 672; 411/546, 367, 539, 531, 411/368, 677
See application file for complete search history.

(56) References Cited

U.S. PATENT DOCUMENTS

| | | | | |
|---|---|---|---|---|
| 7,153,054 B2* | 12/2006 | Arbona | ................ | B62D 29/048 403/28 |
| 7,581,301 B2* | 9/2009 | Arbona | ................ | B62D 29/048 29/525.02 |
| 2008/0003079 A1* | 1/2008 | Martinson | ............... | F16B 2/005 411/539 |
| 2012/0076673 A1* | 3/2012 | Thomas | ................ | F16B 33/002 417/313 |
| 2012/0205507 A1* | 8/2012 | Sato | ..................... | H05K 5/0073 248/222.13 |
| 2012/0248275 A1* | 10/2012 | Soh | ..................... | B60R 16/0215 248/314 |
| 2013/0056613 A1* | 3/2013 | Thomas | ................ | F04B 39/128 248/677 |
| 2014/0133935 A1* | 5/2014 | MacNeil | ................... | G09F 7/18 411/337 |

FOREIGN PATENT DOCUMENTS

| | | |
|---|---|---|
| JP | 2012-170216 A | 9/2012 |
| JP | 2013-24255 A | 2/2013 |

\* cited by examiner

FIXING STRUCTURE AND ELECTRICAL CONNECTION BOX

CROSS-REFERENCE TO RELATED APPLICATION(S)

The present application claims priority to and incorporates by reference the entire contents of Japanese Patent Application No. 2016-200787 filed in Japan on Oct. 12, 2016.

BACKGROUND OF THE INVENTION

1. Field of the Invention

The present invention relates to a fixing structure and an electrical connection box.

2. Description of the Related Art

In the related art, there is known an electrical connection box (also called a junction box, a fuse box, a relay box, and the like) mounted on a vehicle such as an automobile to internally and integrally house connection components such as a wire harness or electrical components such as a fuse, a relay, and an electronic control unit. Such an electrical connection box is formed of an insulating resin material and is fixed to a chassis using various fixing structures (for example, see Japanese Patent Application Laid-open No. 2012-170216).

An electrical connection box has, for example, installation holes having a diameter larger than a typical size in consideration of a tolerance of a chassis-side installation position. For this reason, for example, a wide flat washer is used in the installation portion of the electrical connection box.

If the diameter of the installation hole is larger than the typical size as in the installation portion of the electrical connection box described above, it is difficult to obtain a sufficient axial force because a base of a flat washer or an installation bolt is bent during fastening of the installation bolt and nut even when a wide flat washer is used. Therefore, there is a demand for improvement.

SUMMARY OF THE INVENTION

In view of the aforementioned problems, the present invention is to provide a fixing structure and an electrical connection box capable of avoiding weakening of an axial force of a fastening portion even when a diameter of the installation hole is large.

In order to solve the above mentioned problem and achieve the object, a fixing structure according to one aspect of the present invention includes an installation portion having an installation hole into which an installation bolt provided in an installation target portion is inserted; a nut fastened to the installation bolt by interposing a washer to fix the installation portion to the installation target portion; and a spacer supported movably in horizontal directions perpendicular to an axial direction of the installation bolt inside the installation portion in a non-fastened state between the installation bolt and the nut, wherein the spacer has a collar portion that is placed between an inner circumferential surface of the installation hole and an outer circumferential surface of the installation bolt and makes contact with the installation target portion and the washer in the axial direction of the installation bolt in a fastened state between the installation bolt and the nut, and a flange portion formed to protrude outward from an outer circumference of the collar portion and supported movably in the horizontal directions in the non-fastened state, and the flange portion is fixed inside the installation portion in the fastened state.

According to another aspect of the present invention, in the fixing structure, it is preferable that the collar portion has an oblong hole shape having a major axis direction aligned in one of two directions perpendicular to each other of the horizontal directions as seen from the axial direction of the installation bolt, and the flange portion is supported movably in a direction perpendicular to the major axis direction of the horizontal directions.

According to still another aspect of the present invention, in the fixing structure, it is preferable that the collar portion has a round hole shape as seen from the axial direction of the installation bolt, and the flange portion is supported movably in two directions perpendicular to each other of the horizontal directions.

In order to achieve the object, an electrical connection box according to still another aspect of the present invention includes a casing; an installation portion protruding from the casing and having an installation hole into which an installation bolt provided in an installation target portion is inserted; a nut fastened to the installation bolt by interposing a washer to fix the installation portion to the installation target portion; and a spacer supported movably in horizontal directions perpendicular to an axial direction of the installation bolt inside the installation portion in a non-fastened state between the installation bolt and the nut, wherein the spacer has a collar portion that is placed between an inner circumferential surface of the installation hole and an outer circumferential surface of the installation bolt and makes contact with the installation target portion and the washer in the axial direction of the installation bolt in a fastened state between the installation bolt and the nut, and a flange portion formed to protrude outward from an outer circumference of the collar portion and supported movably in the horizontal directions in the non-fastened state, and the flange portion is fixed inside the installation portion in the fastened state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will be described in details with reference to the accompanying drawings. Note that the present invention is not limited by the following embodiments. In addition, elements in the following embodiments include those which can be easily replaced by a person ordinarily skilled in the art, or those which are substantially equivalent. Furthermore, various omissions, substitutions, and changes may be possible for the elements in the embodiments described below without departing from the spirit and scope of the invention.

First Embodiment

Figure 1:
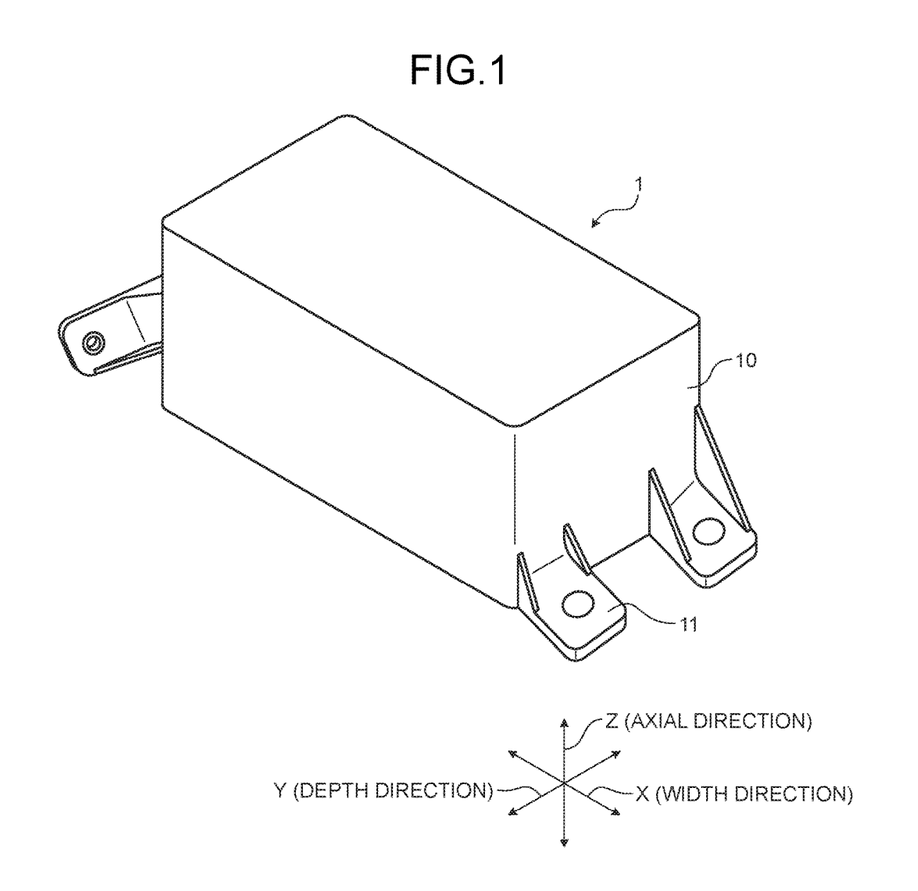
FIG. 1 is a perspective view illustrating a schematic configuration of an electrical connection box provided with a fixing structure according to a first embodiment.
Figure 2:
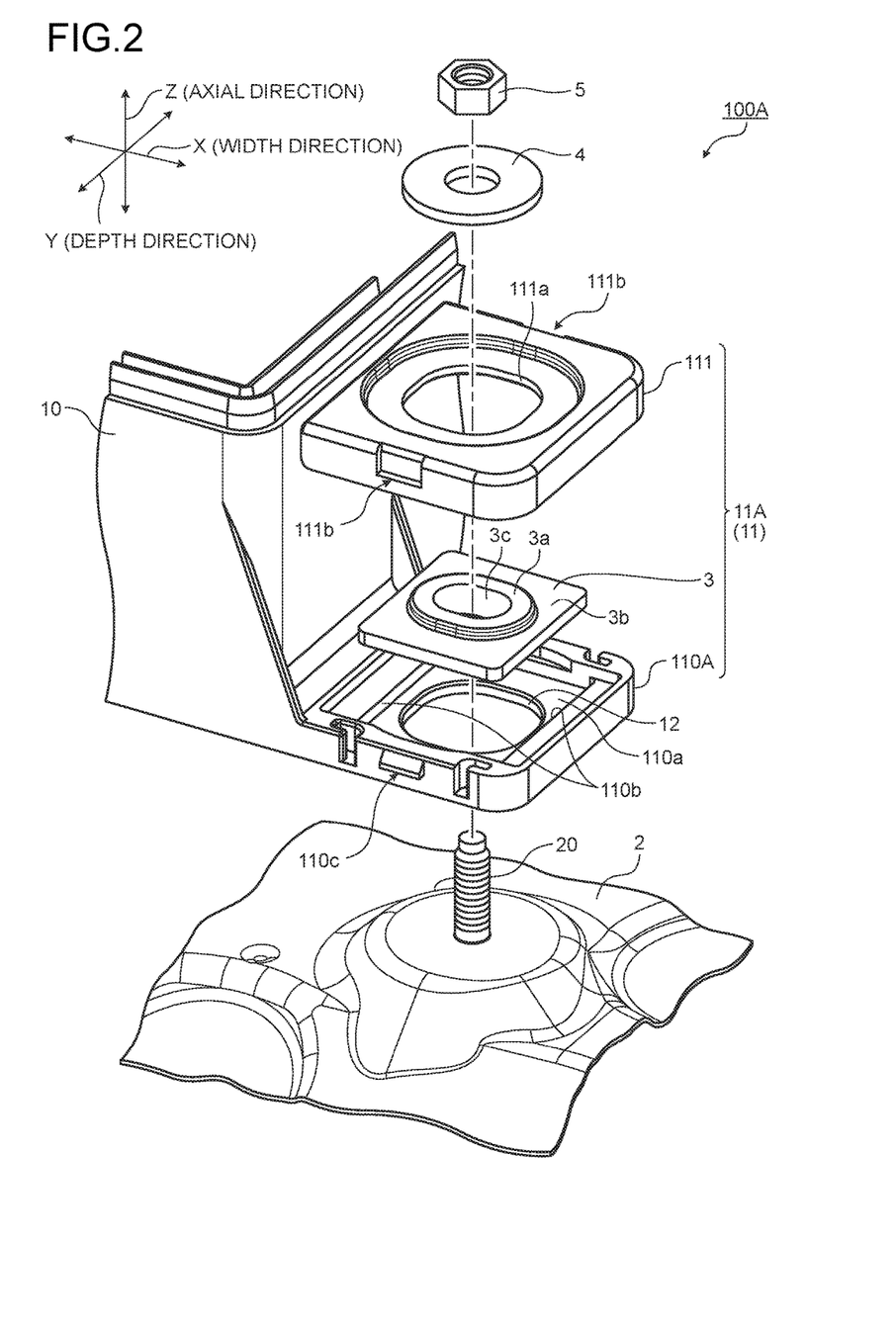
FIG. 2 is an exploded perspective view illustrating a schematic configuration of the fixing structure according to the first embodiment.
Figure 3:
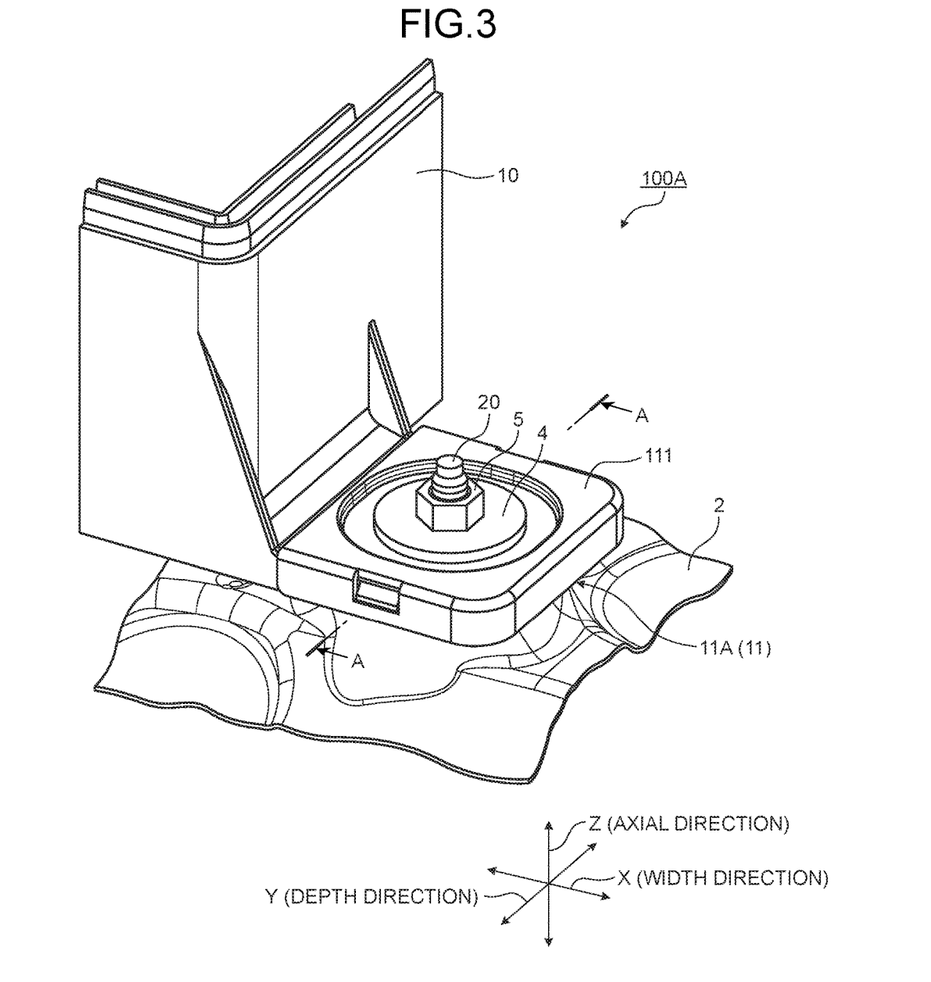
FIG. 3 is a perspective view illustrating a schematic configuration of the fixing structure according to the first embodiment.
Figure 4:
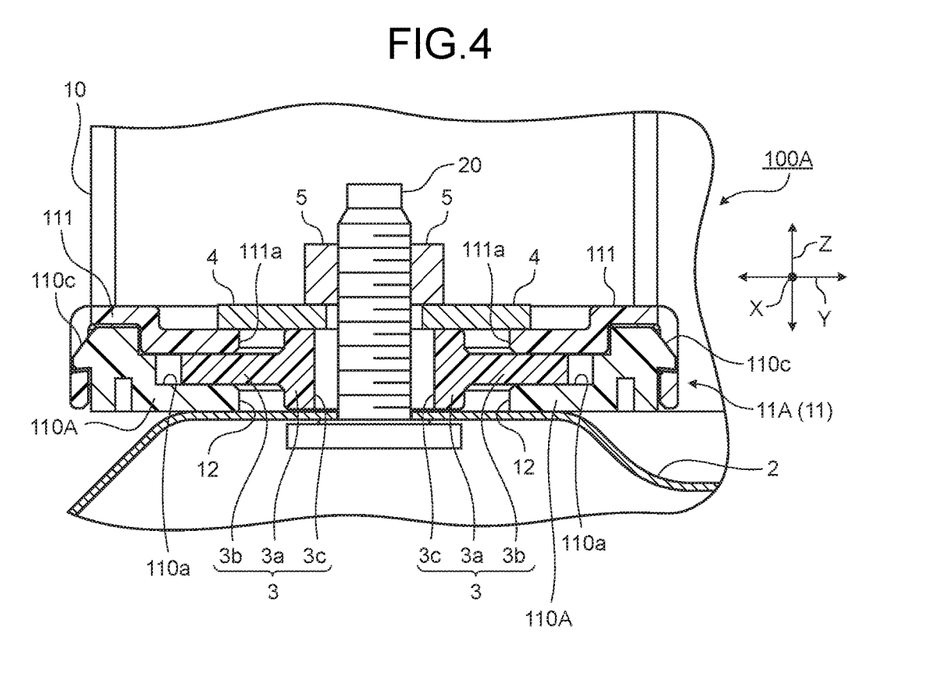
FIG. 4 is a cross-sectional view illustrating a schematic configuration of the fixing structure according to the first embodiment.
Figure 5:
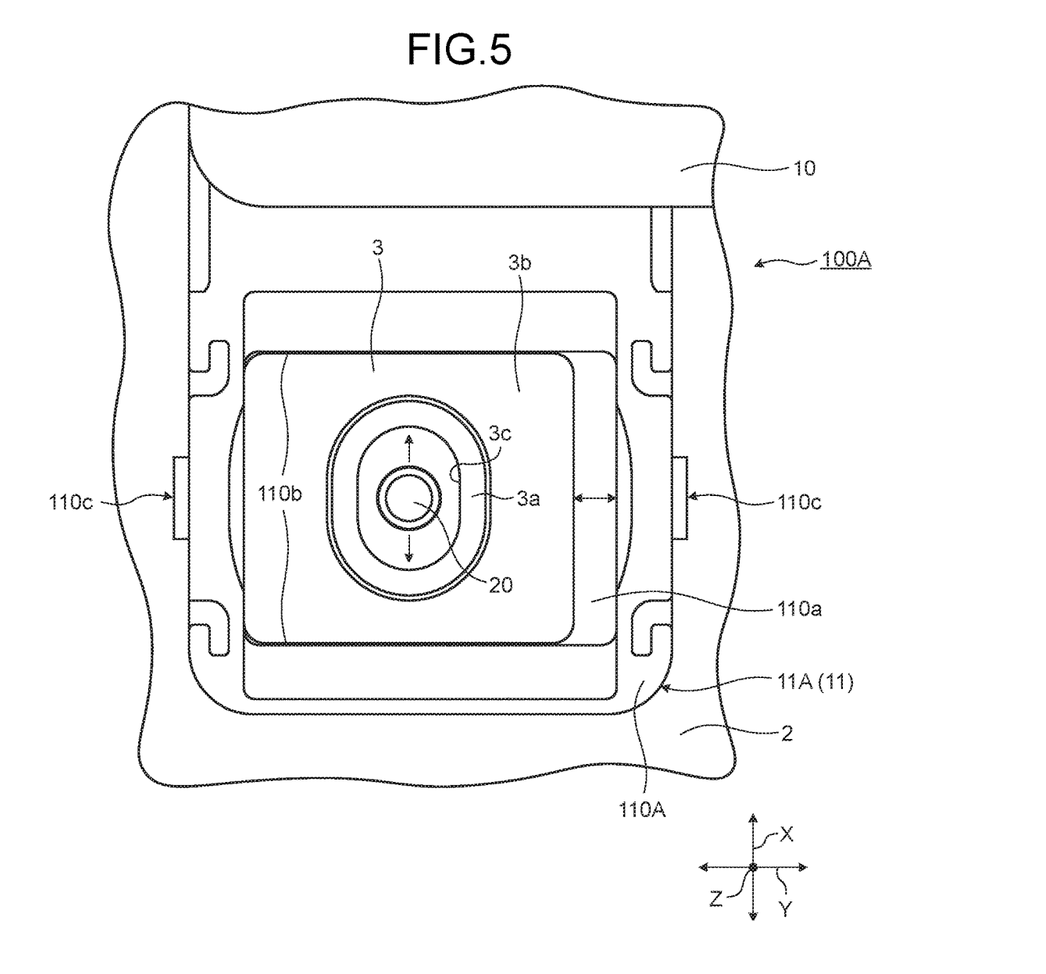
FIG. 5 is a plan view illustrating a schematic configuration of the fixing structure according to the first embodiment.
Figure 6:
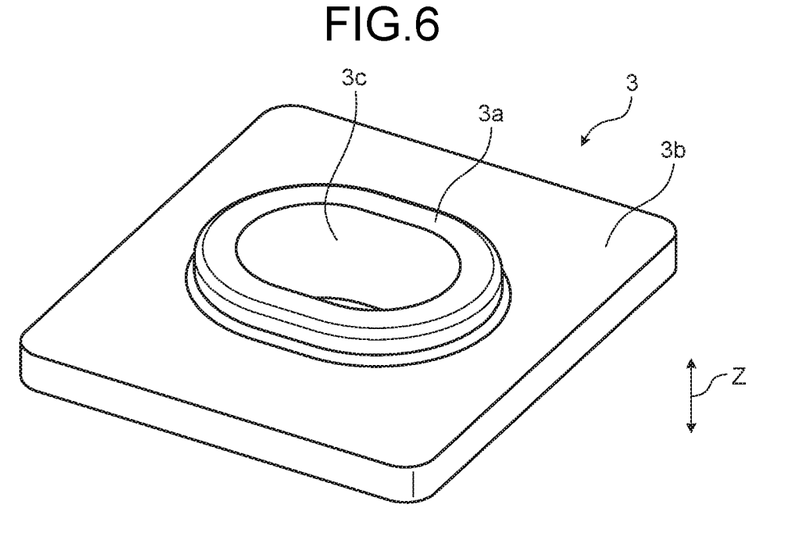
FIG. 6 is a perspective view illustrating a schematic configuration of a spacer according to the first embodiment.

A fixing structure and an electrical connection box according to a first embodiment will be described with reference to FIGS. 1 to 6. FIG. 1 is a perspective view illustrating a schematic configuration of the electrical connection box provided with a fixing structure according to the first embodiment. FIG. 2 is an exploded perspective view illustrating a schematic configuration of the fixing structure according to the first embodiment. FIG. 3 is a perspective view illustrating a schematic configuration of the fixing structure according to the first embodiment. FIG. 4 is a cross-sectional view illustrating a schematic configuration of the fixing structure according to the first embodiment. FIG. 5 is a plan view illustrating a schematic configuration of the fixing structure according to the first embodiment. FIG. 6 is a perspective view illustrating a schematic configuration of the spacer according to the first embodiment. Note that FIG. 4 is a cross-sectional view taken along the line A-A of FIG. 3. FIG. 5 is a diagram illustrating the fixing structure according to the first embodiment as seen in an axial direction of the installation bolt, in which a bolt, a washer, and a cover are intentionally omitted.

In the following description, a Z direction of FIGS. 1 to 6 will be also referred to as an "axial direction" of an installation bolt 20 provided in a chassis 2. An X direction is, among horizontal directions perpendicular to the Z direction, an "extending direction" along which an installation portion 11 protruding from a casing 10 of an electrical connection box 1 extends and will also be referred to as a "width direction." A Y direction perpendicular to the Z and X directions will also be referred to as a "depth direction." Note that the axial direction is not limited to a vertical direction.

A fixing structure 100A according to this embodiment is applied to, for example, an electrical connection box 1 mounted on a vehicle such as an automobile. The electrical connection box 1 internally and integrally houses connection components such as a wire harness or electrical components such as a fuse, a relay, and an electronic control unit as described above. The electrical connection box 1 is installed in and fixed to, for example, a chassis 2 of an engine room of a vehicle. The electrical connection box 1 includes a casing 10 formed of a synthetic resin material and a plurality of installation portions 11 as illustrated in FIG. 1. The casing 10 houses the connection components or the electrical components as described above. The installation portion 11 is an installation portion of the electrical connection box 1 and is fixed to the chassis 2 side. Note that a cover is intentionally omitted from the casing 10 of FIG. 1.

As illustrated in FIGS. 2 to 5, the fixing structure 100A includes an installation portion 11A (11), a spacer 3, a washer 4, and a nut 5.

The installation portion 11A (11) is a bracket provided on an outer surface of the casing 10. The installation portion 11A (11) is installed in a chassis 2 serving as an installation target portion. An installation bolt 20 provided in the chassis 2 is inserted into an installation hole 12. The installation hole 12 is formed to be larger than a typical size of its hole diameter in order to absorb a positional deviation of the installation bolt 20 caused by a tolerance of the installation portion of the chassis 2 side as described above. That is, the installation hole 12 is a so-called loose hole that allows the inserted installation bolt 20 to move in a horizontal direction. The installation portion 11A (11) according to this embodiment is fixed to the chassis 2 by fastening a nut 5 to the installation bolt 20 by interposing a washer 4 while the installation bolt 20 is inserted into the installation hole 12.

A main body 110A protrudes from a side surface of the casing 10. The main body 110A is installed in the chassis 2 serving as an installation target portion. That is, the main body 110A includes a concave portion 110a, spacer movement restriction surfaces 110b, a locking protrusion 110c, and an installation hole 12. The concave portion 110a is a portion hollowed substantially in a rectangular shape to house the spacer 3. The concave portion 110a is provided with the installation hole 12 on a bottom surface. The spacer movement restriction surfaces 110b are inner surfaces formed to abut on outer surfaces of the X direction of the spacer 3 in order to restrict a movement of the spacer 3 in the X direction. The spacer movement restriction surfaces 110b are formed on inner surfaces opposite to each other in the X direction among the inner surfaces of the concave portion 110a. The spacer movement restriction surfaces 110b are formed such that an outer surface of the X direction of the spacer 3 can slide in a non-fastened state between the installation bolt 20 and the nut 5. The locking protrusion 110c is formed in a protrusion shape in order to lock a cover portion 111 to the main body 110A. The installation hole 12 is a through-hole provided to penetrate in a thickness direction of the main body 110A, that is, in the Z direction. The installation bolt 20 provided in the chassis 2 is inserted into the installation hole 12.

The cover portion 111 is overlaid to cover an upper side surface of the axial direction of the main body 110A, that is, an upper surface. The cover portion 111 has a through-hole 111a and a locking hole 111b. The installation bolt 20 is inserted into the through-hole 111a. The through-hole 111a has a diameter substantially equal to that of the installation hole 12 and is positioned substantially concentrically with the axial direction of the installation hole 12 while the cover portion 111 is overlaid on the main body 110A. The locking hole 111b is locked to the locking protrusion 110c of the main body 110A side. The installation portion 11A (11) according to this embodiment is fixed to the chassis 2 by fastening the nut 5 to the installation bolt 20 by interposing the washer 4 while housing the spacer 3 in the concave portion 110a of the main body 110A and inserting the installation bolt 20.

The spacer 3 is formed of metal such as steel or aluminum alloy or synthetic resin. The spacer 3 is housed in the concave portion 110a of the main body 110A. The spacer 3 is movably supported in the Y direction inside the installation portion 11A (11) in a non-fastened state between the installation bolt 20 and the nut 5. Meanwhile, a movement of the spacer 3 in the X direction inside the installation portion 11A (11) is restricted by the spacer movement restriction surfaces 110b in a non-fastened state between the installation bolt 20 and the nut 5. That is, both side faces of the spacer 3 of the X direction abut on the spacer movement restriction surfaces 110b so that a movement in the X direction is restricted. The spacer 3 has a collar portion 3a, a flange portion 3b, and a through-hole 3c.

The collar portion 3a is formed to protrude from the flange portion 3b in the Z direction. The collar portion 3a is formed in a substantially elliptical tubular shape having a major axis aligned in the X direction as seen from the axial direction of the installation bolt 20. The collar portion 3a according to this embodiment has an oblong hole shape having a major axis direction aligned in the X direction as seen from the axial direction of the installation bolt 20. As illustrated in FIG. 4, the collar portion 3a is placed between the inner circumferential surface of the installation hole 12 and the outer circumferential surface of the installation bolt 20 and makes contact with the chassis 2 and the washer 4 in the axial direction of the installation bolt 20 in a fastened state between the installation bolt 20 and the nut 5.

The flange portion 3b has an outer circumference formed in a substantially rectangular shape as seen from the axial direction of the installation bolt 20. The flange portion 3b is formed to protrude outward from the outer circumference of the collar portion 3a and is supported movably in the Y direction in a non-fastened state between the installation bolt 20 and the nut 5. That is, in order to restrict a movement of the X direction of the flange portion 3b, a width between both outer surfaces of the X direction of the flange portion 3b is substantially equal to a width between both inner surfaces of the X direction of the concave portion 110a, that is, a width between the spacer movement restriction surfaces 110b of the X direction. Meanwhile, in order to absorb a positional deviation of the Y direction of the installation bolt 20, a width of the flange portion 3b between both outer surfaces of the Y direction is formed to be shorter than a width between both inner surfaces of the Y direction of the concave portion 110a. Note that the flange portion 3b may be formed movably in the X direction by forming the spacer movement restriction surfaces 110b on both inner surfaces of the Y direction of the concave portion 110a.

The through-hole 3c is formed to penetrate in a thickness direction of the collar portion 3a, that is, in the Z direction. The through-hole 3c has an oblong hole shape having a major axis direction aligned in the X direction. That is, in order to absorb a positional deviation of the X direction of the installation bolt 20, the through-hole 3c has a hole diameter of the X direction of the oblong hole, that is, a hole diameter of the major axis direction larger than a hole diameter of the Y direction, that is, the minor axis direction. Note that the through-hole 3c may have an oblong hole shape having a major axis direction aligned in the Y direction.

The washer 4 is a ring-shaped metal washer. The washer 4 protects a seat surface of the installation portion 11A (11) and obtains an axial force from the nut 5 to securely fix the installation portion 11A (11) to the chassis 2. According to this embodiment, in order to reduce a manufacturing variation, the washer 4 is preferably formed in a wide shape such that the diameter of the installation hole 12 of the installation portion 11A (11) is larger than a bolt diameter of the installation bolt 20 to stabilize the seat surface.

The nut 5 is a metal hexagonal nut. The nut 5 is fastened to the installation bolt 20 by interposing the washer 4 to fix the installation portion 11A (11) to the chassis 2.

In the fixing structure 100A and the electrical connection box 1 described above, the through-hole 3c of the collar portion 3a has an oblong hole shape having one of two directions perpendicular to each other out of horizontal directions as a major axis direction. As a result, the collar portion 3a can move in the X or Y direction while the installation bolt 20 is inserted into the through-hole 3c in a non-fastened state between the installation bolt 20 and the nut 5. Therefore, it is possible to easily absorb a positional deviation of the X or Y direction of the installation bolt 20.

In the fixing structure 100A and the electrical connection box 1 described above, a width of the flange portion 3b between both outer surfaces of one of two directions perpendicular to each other out of the horizontal directions is formed to be shorter than a width between both inner surfaces of the one direction of the concave portion 110a. That is, the flange portion 3b is supported inside the installation portion 11A (11) movably in the X or Y direction perpendicular to the axial direction of the installation bolt 20. As a result, the flange portion 3b can move in the X or Y direction while the installation bolt 20 is inserted into the through-hole 3c in a non-fastened state between the installation bolt 20 and the nut 5. Therefore, it is possible to easily absorb a positional deviation of the X or Y direction of the installation bolt 20.

In the fixing structure 100A and the electrical connection box 1 described above, the spacer 3 has the collar portion 3a that is placed between the inner circumferential surface of the installation hole 12 and the outer circumferential surface of the installation bolt 20 and makes contact with the chassis 2 and the washer 4 in the axial direction of the installation bolt 20 in a fastened state between the installation bolt 20 and the nut 5. Therefore, even when the diameter of the installation hole 12 is large, it is possible to securely orient the axial force for fastening the nut 5 along the axial direction of the installation bolt 20 and avoid weakening of the axial force of the fastening portion caused when at least one of the bases of the washer 4 and the installation bolt 20 is bent. Furthermore, it is possible to reduce buckling of the seat surface of the installation hole 12.

The fixing structure 100A described above has the installation portion 11A (11) having an installation hole 12 into which the installation bolt 20 provided in the chassis 2 is inserted, and the spacer 3 supported movably in a horizontal direction perpendicular to the axial direction of the installation bolt 20 inside the installation portion 11A (11) in a non-fastened state between the installation bolt 20 and the nut 5. The spacer 3 has the collar portion 3a that is placed between the inner circumferential surface of the installation hole 12 and the outer circumferential surface of the installation bolt 20 and makes contact with the chassis 2 and the washer 4 in the axial direction of the installation bolt 20 in a fastened state between the installation bolt 20 and the nut 5, and the flange portion 3b formed to protrude outward from the outer circumference of the collar portion 3a and supported movably in the horizontal direction in the non-fastened state. The flange portion 3b is fixed inside the installation portion 11A (11) in the fastened state.

Using the fixing structure 100A having the aforementioned configuration, the spacer 3 can securely orient the axial force for fastening the nut 5 along the axial direction of the installation bolt 20. Therefore, it is possible to avoid weakening of the axial force of the fastening portion caused by bending of the washer 4 or the like. Furthermore, it is not necessary to newly install a special nut having a wide width on two sides or reinforce a base of the installation bolt 20 to avoid weakening of the axial force of the fastening portion and buckling of the seat surface of the installation portion 11A (11). Therefore, it is possible to avoid a cost increase.

In the fixing structure 100A described above, the collar portion 3a has an oblong hole shape having a major axis direction aligned in one of two directions perpendicular to each other out of the horizontal directions as seen from the axial direction of the installation bolt 20. The flange portion 3b is supported movably in a direction perpendicular to the major axis direction of the horizontal directions. As a result, it is possible to easily absorb a positional deviation of the horizontal direction of the installation bolt 20 and the installation hole 12.

The electrical connection box 1 described above has a casing 10, an installation portion 11A (11) that protrudes from the casing 10 and has the installation hole 12 into which the installation bolt 20 provided in the chassis 2 is inserted, and the spacer 3 supported movably in a horizontal direction perpendicular to the axial direction of the installation bolt 20 inside the installation portion 11A (11) in a non-fastened state between the installation bolt 20 and the nut 5. The spacer 3 has the collar portion 3a that is placed between the inner circumferential surface of the installation hole 12 and the outer circumferential surface of the installation bolt 20 and makes contact with the chassis 2 and the washer 4 in the axial direction of the installation bolt 20 in a fastened state between the installation bolt 20 and the nut 5, and the flange portion 3b formed to protrude outward from the outer circumference of the collar portion 3a and supported movably in the horizontal direction in a non-fastened state. The flange portion 3b is fixed inside the installation portion 11A (11) in a fastened state.

Using the electrical connection box 1 having the aforementioned configuration, it is possible to obtain the same effects as those of the fixing structure 100A described above.

Second Embodiment

Figure 7:
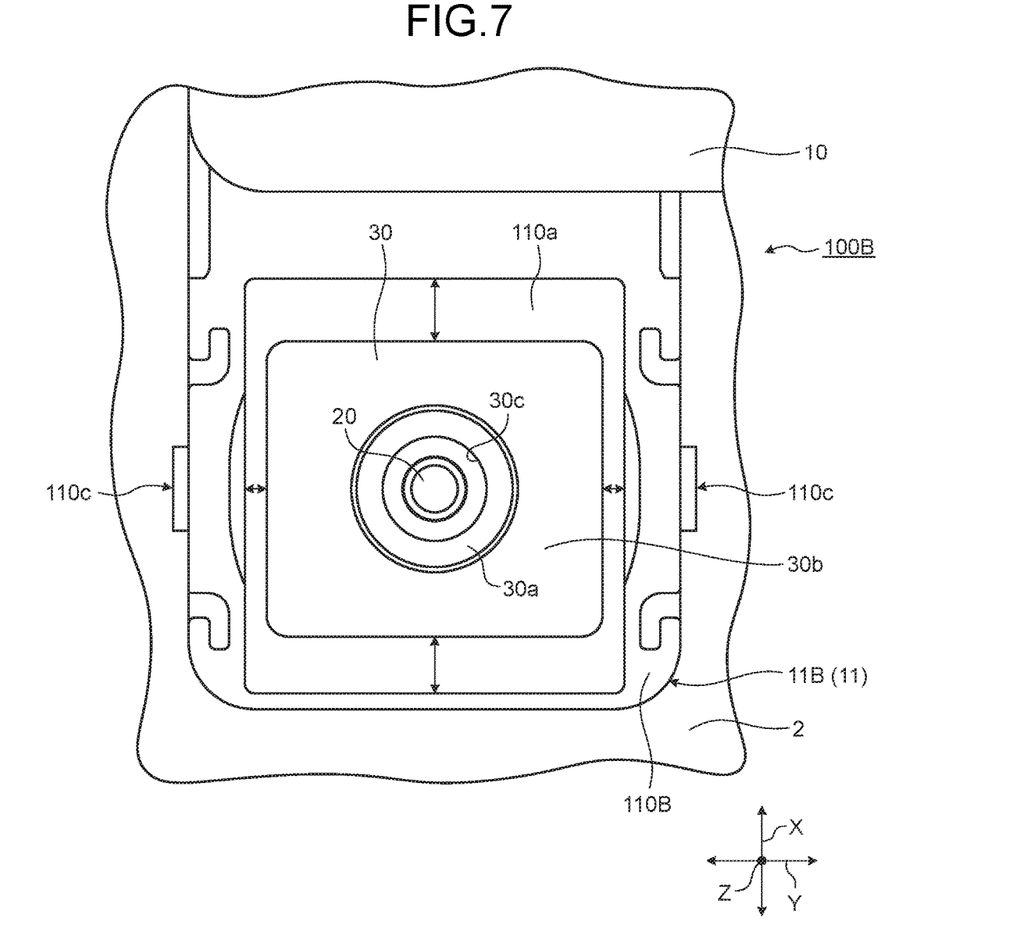
FIG. 7 is a plan view illustrating a schematic configuration of the fixing structure according to a second embodiment.
Figure 8:
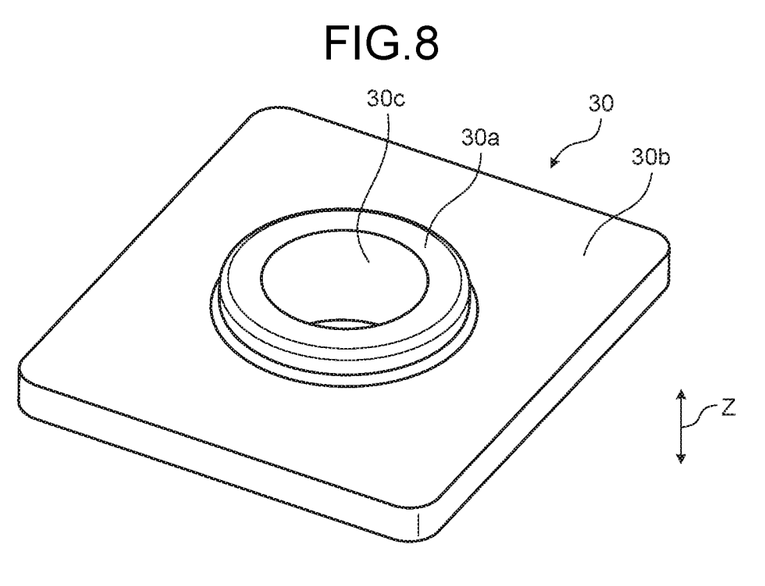
FIG. 8 is a perspective view illustrating a schematic configuration of the spacer according to the second embodiment.

Next, a fixing structure and an electrical connection box according to a second embodiment will be described with reference to FIGS. 7 and 8. FIG. 7 is a plan view illustrating a schematic configuration of the fixing structure according to the second embodiment. FIG. 8 is a perspective view illustrating a schematic configuration of a spacer according to the second embodiment. Note that FIG. 7 is a diagram illustrating the fixing structure according to the second embodiment as seen from the axial direction of the installation bolt, in which a bolt, a washer, and a cover portion are intentionally omitted.

A fixing structure 100B according to the second embodiment is different from that of the first embodiment in configurations of the installation portion and the spacer. In the following description, like reference numerals denote like elements as in the first embodiment, and any configuration, function, or effect similar to those of the first embodiment will not be described repeatedly (this similarly applies below).

As illustrated in FIGS. 7 and 8, the fixing structure 100B according to this embodiment includes an installation portion 11B (11), a washer 4, and a nut 5.

The installation portion 11B (11) has a main body 110B and a cover portion 111. The main body 110B is formed to protrude from the side surface of the casing 10. The main body 110B is installed in the chassis 2 serving as an installation target portion. The main body 110B has a concave portion 110a, a locking protrusion 110c, and an installation hole 12. The main body 110B according to this embodiment does not have the spacer movement restriction surface 110b unlike the main body 110A of the first embodiment. That is, a spacer 30 is supported movably in two directions perpendicular to each other out of horizontal directions. The locking protrusion 110c is formed in a protrusion shape in order to lock the cover portion 111 to the main body 110B. The cover portion 111 is overlaid to cover an upper side surface of the axial direction of the main body 110B, that is, the upper surface.

The spacer 30 is formed of metal such as steel or aluminum alloy or synthetic resin. The spacer 30 is housed in the concave portion 110a of the main body 110B. The spacer 30 is supported movably in the X and Y directions inside the installation portion 11B (11) in a non-fastened state between the installation bolt 20 and the nut 5. The spacer 30 has a collar portion 30a, a flange portion 30b, and a through-hole 30c.

As illustrated in FIG. 8, the collar portion 30a is formed to protrude from the flange portion 30b in the Z direction. The collar portion 30a is formed in a substantially circular tubular shape as seen from the axial direction of the installation bolt 20. The collar portion 30a is placed between the inner circumferential surface of the installation hole 12 and the outer circumferential surface of the installation bolt 20 and makes contact with the chassis 2 and the washer 4 in the axial direction of the installation bolt 20 in a fastened state between the installation bolt 20 and the nut 5.

The flange portion 30b has an outer circumference formed in a substantially rectangular shape as seen from the axial direction of the installation bolt 20. The flange portion 30b is formed to protrude outward from the outer circumference of the collar portion 30a and is supported movably in the horizontal directions including the X and Y directions in a non-fastened state between the installation bolt 20 and the nut 5. That is, in order to absorb a positional deviation of the X direction of the installation bolt 20, a width between both outer surfaces of the X direction of the flange portion 30b is formed to be shorter than a width between both inner surfaces of the X direction of the concave portion 110a. In addition, in order to absorb a positional deviation of the Y direction of the installation bolt 20, a width of the flange portion 30b between both outer surfaces of the Y direction portion 30b is formed to be shorter than a width between both inner surfaces of the Y direction of the concave portion 110a.

The through-hole 30c is provided to penetrate in the thickness direction of the collar portion 30a, that is, in the Z direction. The through-hole 30c has a round hole shape. That is, the through-hole 30c has a round hole shape as seen from the axial direction of the installation bolt 20 in order to restrict a movement in the horizontal directions including the X and Y directions of the flange portion 3b.

In the fixing structure 100B and the electrical connection box 1 described above, a width between both outer surfaces of the X direction of the flange portion 30b is formed to be shorter than a width between both inner surfaces of the X direction of the concave portion 110a. In addition, a width between both outer surfaces of the Y direction of the flange portion 30b is formed to be shorter than a width between the both inner surfaces of the Y direction of the concave portion 110a. That is, the flange portion 30b is supported movably in the X and Y directions perpendicular to the axial direction of the installation bolt 20 inside the installation portion 11B (11). As a result, the flange portion 30b can move in the horizontal directions while the installation bolt 20 is inserted into the through-hole 30c in a non-fastened state between the installation bolt 20 and the nut 5. Therefore, it is possible to easily absorb a positional deviation of the X or Y direction of the installation bolt 20.

In the fixing structure 100B and the electrical connection box 1 described above, the collar portion 30a has a round hole shape as seen from the axial direction of the installation bolt 20. The flange portion 30b is supported movably in two directions perpendicular to each other out of the horizontal directions. As a result, it is possible to easily absorb a positional deviation of the horizontal direction of the installation bolt 20 and the installation hole 12.

Using the fixing structure 100B and the electrical connection box 1 described above, it is possible to obtain the same effects as those of the fixing structure 100A and the electrical connection box 1 described above.

Modification

Note that, although the installation portion 11 (11A or 11B) is divided into the main body 110A or 110B and the cover portion 111 in the aforementioned description, the cover portion 111 and the main body 110A or 110B may be connected to each other using a hinge structure. In addition, the cover portion 111 and the main body 110A or 110B may be integrated to each other, and the spacer 3 or 30 may be insert-molded to the inside.

Treatment for improving a static frictional force may be applied to the upper and lower surfaces of the flange portion 3b or 30b of the spacer 3 or 30 or a shape for improving a static frictional force may be provided on the spacer 3 or 30. As a result, it is possible to reduce a relative deviation between the spacer 3 or 30 and the installation portion 11 (11A or 11B) in a fastened state between the installation bolt 20 and the nut 5.

According to the embodiment, it is possible to avoid weakening of the axial force of the fastening portion even when a diameter of the installation hole is large.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fixing structure comprising:
an installation portion comprising a main body and a cover portion that is configured to cover a surface of the main body, the main body having an installation hole into which an installation bolt provided in an installation target portion is inserted, and the cover portion having a through-hole into which the installation bolt is inserted;
a nut fastened to the installation bolt by interposing a washer to fix the installation portion to the installation target portion; and
a spacer supported movably in horizontal directions perpendicular to an axial direction of the installation bolt inside the installation portion in a non-fastened state between the installation bolt and the nut, wherein
the spacer has
a collar portion that is placed between an inner circumferential surface of the installation hole and an outer circumferential surface of the installation bolt and makes contact with the installation target portion and the washer in the axial direction of the installation bolt in a fastened state between the installation bolt and the nut, and
a flange portion formed to protrude outward from an outer circumference of the collar portion and supported movably in the horizontal directions in the non-fastened state,
the flange portion is fixed inside the installation portion in the fastened state,
the collar portion extends in a first direction into the installation hole of the main body and extends in a second direction, opposite of the first direction, into the through-hole of the cover portion,
the collar portion has an oblong hole shape having a major axis direction aligned in a direction that extends in a same plane as the horizontal directions and that is perpendicular to a first direction of the horizontal directions as seen from the axial direction of the installation bolt, the spacer being restricted from moving, inside the installation portion in the non-fastened state, in the direction that extends in the same plane as the horizontal directions, and
the flange portion is supported movably in the first direction of the horizontal directions that is perpendicular to the major axis direction.

2. An electrical connection box comprising:
a casing;
an installation portion protruding from the casing and comprising a main body and a cover portion that is configured to cover a surface of the main body, the main body having an installation hole into which an installation bolt provided in an installation target portion is inserted, and the cover portion having a through-hole into which the installation bolt is inserted;
a nut fastened to the installation bolt by interposing a washer to fix the installation portion to the installation target portion; and
a spacer supported movably in horizontal directions perpendicular to an axial direction of the installation bolt inside the installation portion in a non-fastened state between the installation bolt and the nut, wherein
the spacer has
a collar portion that is placed between an inner circumferential surface of the installation hole and an outer circumferential surface of the installation bolt and makes contact with the installation target portion and the washer in the axial direction of the installation bolt in a fastened state between the installation bolt and the nut, and
a flange portion formed to protrude outward from an outer circumference of the collar portion and supported movably in the horizontal directions in the non-fastened state,
the flange portion is fixed inside the installation portion in the fastened state,
the collar portion extends in a first direction into the installation hole of the main body and extends in a second direction, opposite of the first direction, into the through-hole of the cover portion,
the collar portion has an oblong hole shape having a major axis direction aligned in a direction that extends in a same plane as the horizontal directions and that is perpendicular to a first direction of the horizontal directions as seen from the axial direction of the installation bolt, the space being restricted from moving, inside the installation portion in the non-fastened state, in the direction that extends in the same plane as the horizontal directions, and the flange portion is supported movably in the first direction of the horizontal directions that is perpendicular to the major axis direction.

3. The fixing structure according to claim 1, wherein the flange portion has a rectangular shape.

4. A fixing structure comprising:
an installation portion comprising a main body and a cover portion that is configured to cover a surface of the main body, the main body having an installation hole into which an installation bolt provided in an installation target portion is inserted, and the cover portion having a through-hole into which the installation bolt is inserted;
a nut fastened to the installation bolt by interposing a washer to fix the installation portion to the installation target portion; and
a spacer supported movably in horizontal directions perpendicular to an axial direction of the installation bolt inside the installation portion in a non-fastened state between the installation bolt and the nut, wherein
the spacer has
a collar portion that is placed between an inner circumferential surface of the installation hole and an outer circumferential surface of the installation bolt and makes contact with the installation target portion and the washer in the axial direction of the installation bolt in a fastened state between the installation bolt and the nut, and
a flange portion formed to protrude outward from an outer circumference of the collar portion and supported movably in the horizontal directions in the non-fastened state,
the flange portion is fixed inside the installation portion in the fastened state,
the collar portion extends in a first direction into the installation hole of the main body and extends in a second direction, opposite of the first direction, into the through-hole of the cover portion,
the main body comprises a pair of inner side surfaces that are opposite from each other, and
each surface of the pair of inner side surfaces simultaneously abuts a respective outer side face of the flange portion such that movement of the spacer in two directions is restricted in a non-fastened state between the installation bolt and the nut, the two directions being both in a same plane as a direction of the horizontal directions and perpendicular to the direction of the horizontal directions.

* * * * *